(12) United States Patent
Gunasekara et al.

(10) Patent No.: US 12,204,846 B2
(45) Date of Patent: Jan. 21, 2025

(54) ENHANCING NATURAL LANGUAGE PROCESSING ACCURACY IN COMPUTER SYSTEMS

(71) Applicant: International Business Machines Corporation, Armonk, NY (US)

(72) Inventors: Chulaka Gunasekara, New Hyde Park, NY (US); Guy Feigenblat, Givataym (IL); Benjamin Sznajder, Jerusalem (IL); Sachindra Joshi, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 17/453,840

(22) Filed: Nov. 6, 2021

(65) Prior Publication Data
US 2023/0146979 A1  May 11, 2023

(51) Int. Cl.
*G06F 40/166* (2020.01)
*G06F 40/205* (2020.01)
*G06F 40/40* (2020.01)
*G06N 20/00* (2019.01)

(52) U.S. Cl.
CPC ......... *G06F 40/166* (2020.01); *G06F 40/205* (2020.01); *G06F 40/40* (2020.01); *G06N 20/00* (2019.01)

(58) Field of Classification Search
CPC ...... G06F 40/166; G06F 40/205; G06F 40/40; G06F 40/35; G06N 20/00; G06N 3/09; G06N 3/092
See application file for complete search history.

(56) References Cited

U.S. PATENT DOCUMENTS 10,909,157 B2  2/2021  Paulus
11,003,704 B2  5/2021  Paulus
2021/0334592 A1*  10/2021  Taniai ................. G06T 7/20
(Continued)

FOREIGN PATENT DOCUMENTS

EP      3620935 A1     3/2020
WO  WO-2020199947 A1 * 10/2020

OTHER PUBLICATIONS

Kristjan Arumae and Fei Liu "Guiding Extractive Summarization with Question-Answering Rewards" Computer Science Department University of Central Florida, arXiv:1904.02321v1 [cs.CL] Apr. 4, 2019 (Year: 2019).*

(Continued)

*Primary Examiner* — Daniel C Washburn
*Assistant Examiner* — Penny L Caudle
(74) *Attorney, Agent, or Firm* — Joseph P. Curcuru

(57) ABSTRACT

In an approach to improve abstract summarization with question and answer rewards embodiments generate, by a question and answer generator, questions and answers corresponding to a generated summary. Further, embodiments evaluate received answers for the generated questions by analyzing received answers associated with the generated summary against answers received for an original summary, and calculate a reward based on the similarity between answers associated with generated summary and the original summary. Additionally, embodiments update the generation model by applying the calculated reward to further train the summary generation model.

20 Claims, 9 Drawing Sheets

(56) References Cited

U.S. PATENT DOCUMENTS

2022/0147713 A1* 5/2022 Garimella .............. G06F 40/56

OTHER PUBLICATIONS

Machine translation of International Publication No. WO 2020199947 A1 (Year: 2020).*
Huang, et al., "Knowledge Graph-Augmented Abstractive Summarization with Semantic-Driven Cloze Reward", Proceedings of the 58th Annual Meeting of the Association for Computational Linguistics, Jul. 2020, pp. 5094-5107, <https://aclanthology.org/2020.acl-main.457.pdf>.
Nan, et al., "Improving Factual Consistency of Abstractive Summarization via Question Answering", arXiv:2105.04623v1, May 10, 2021, 16 pages, <https://arxiv.org/abs/2105.04623>.
Yadav, et al., "Reinforcement Learning for Abstractive Question Summarization with Question-aware Semantic Rewards", arXiv:2107.00176v1, Jul. 1, 2021, 7 pages, <https://arxiv.org/pdf/2107.00176.pdf>.
Zhang, et al., "Improving Neural Abstractive Summarization via Reinforcement Learning with BERTScore", CS229: Machine Learning, Fall 2019, 6 pages, <http://cs229.stanford.edu/proj2019aut/data/assignment_308832_raw/26632588.pdf>.
Gunasekara et al., "Using Question Answering Rewards to Improve Abstractive Summarization," Findings of the Association for Computational Linguistics: EMNLP 2021, Nov. 2021, pp. 518-526.

* cited by examiner

| Original Document/Dialog | |
|---|---|
| Charlee: | I'm in class. Theatre in Portuguese lol. |
| Curtis: | Realllly? |
| Charlee: | Yes. One of my subjects at the university that I attend is portuguese theatre. |
| Charlee: | We are preparing for a performance. |
| Curtis: | What performance is this? Are you devising it? |
| Charlee: | A polish one translated into portuguese. |
| Curtis: | Thats quite cool. Who is the writer? |
| Charlee: | Mrozek. |

| Ground truth (human) summary |
|---|
| Charlee is attending Portuguese theater as a subject at university. He and other students are preparing a play by Mrozek translated into Portuguese. |

| Generated Summary 1 : Failing to capture critical facts |
|---|
| Charlee is preparing for a performance in Portuguese. The writer is Mrozek. |

| Generated Summary 2 : Inconsistent facts with the original document |
|---|
| Charlee and Curtis are preparing for a performance in Portuguese. The performance is a Polish one translated into Portuguese. |

| Generated Summary 3: A summary generated with our approach |
|---|
| Charlee is in Portuguese theater class preparing for a Portuguese translation of a Polish play. The writer is Mrozek |

FIG. 3

Algorithm 1: QA Framework for factuality reward calculation

Input: Trained Summarization Model ($S$), Question-Answer Generation Model ($QA$), Answer Generation Model ($A$), Input Document ($D$), Ground Truth Summary ($G_t$), Textual Similarity Function ($T$)

Output: Reward value($R$) for Generated Summary ($G_a$)

1. Obtain the Generated Summary $G_a = S(D)$
2. Generate the questions and the corresponding answers from $G_a$, $G_t$.
   (I) $Q_{G_a}, A_{G_a} = QA(G_a)$
   (II) $Q_{G_t}, A_{G_t} = QA(G_t)$
   where, $Q_{G_a}$ represents the question set generated for the text $G_a$ and $A_{G_a}$ represents the corresponding answer set.
3. Ask the $Q_{G_a}$ from the $G_t$, and obtain the corresponding answer set $AG_a'$ using $A$. Similarly, ask $Q_{G_t}$ from the $G_a$, and obtain the corresponding answer set $AG_t'$ using $A$.
   (I) $AG_a' = A(G_t, Q_{G_a})$
   (II) $AG_t' = A(G_a, Q_{G_t})$
4. Calculate the reward for $G_a$ by the similarity between $AG_a'$ and $AG_a$ as well as similarity between $AG_t'$ and $AG_t$.
   $R = Average[T(AG_a', AG_a) + T(AG_t', AG_t)]$

FIG. 5

| Model | R-1 | R-2 | R-L | R-SU4 |
|---|---|---|---|---|
| GPT-2 | 42.90 | 20.75 | 33.94 | 19.97 |
| BART | 52.85 | 32.05 | 44.06 | 29.58 |
| Pegasus | 52.86 | 32.36 | 44.76 | 30.28 |
| GPT-2-QA | 44.94 | 22.27 | 35.24 | 21.46 |
| BART-QA | 55.50 | 33.91 | 46.20 | 31.75 |
| Pegasus-QA | 55.43 | 34.81 | 47.04 | 32.46 |

Table 1: Abstractive summarizers on SAMSUM

FIG. 6A

| Model | R-1 | R-2 | R-L | R-SU4 |
|---|---|---|---|---|
| GPT-2 | 25.30 | 5.61 | 18.87 | 8.11 |
| BART | 45.58 | 22.47 | 37.61 | 22.38 |
| Pegasus | 47.33 | 24.59 | 39.43 | 24.16 |
| GPT-2-QA | 28.73 | 7.41 | 21.01 | 9.85 |
| BART-QA | 46.98 | 23.14 | 38.31 | 23.96 |
| Pegasus-QA | 48.11 | 25.13 | 41.06 | 25.28 |

Table 2: Abstractive summarizers on XSUM

FIG. 6B

| MODEL | SAMSUM | | | XSUM | | |
|---|---|---|---|---|---|---|
| | P | R | F-1 | P | R | F-1 |
| GPT-2 | 27.88 | 24.64 | 26.26 | 11.52 | 10.17 | 10.85 |
| BART | 40.93 | 35.98 | 38.46 | 35.40 | 29.36 | 32.38 |
| Pegasus | 46.64 | 36.89 | 41.77 | 38.12 | 32.69 | 35.40 |
| GPT-2-QA | 28.79 | 28.47 | 28.63 | 14.11 | 13.55 | 13.82 |
| BART-QA | 43.10 | 41.56 | 42.33 | 39.30 | 31.96 | 35.63 |
| Pegasus-QA | 47.89 | 38.96 | 42.93 | 41.30 | 34.24 | 37.77 |

Table 3: Results of QA based evaluation

FIG. 6C

| MODEL | Factual Consistency | | Quality | |
|---|---|---|---|---|
| | SAMSUM | XSUM | SAMSUM | XSUM |
| BART | 6 (20%) | 1 (3%) | 6 (20%) | 4 (13%) |
| BART-QA | 16 (53%) | 15 (50%) | 16 (53%) | 18 (60%) |
| Pegasus | 7 (23%) | 5 (17%) | 4 (13%) | 5 (17%) |
| Pegasus-QA | 16 (53%) | 14 (47%) | 13 (43%) | 14 (47%) |

Table 4: Results of human evaluation

FIG. 6D

| | |
|---|---|
| *Original Document/Dialog* | 700 | person_0: Hi person_1!
person_1: Hello
person_0: Do u have any plans for tonight?
person_1: I'm going to visit my grandma.
person_1: You can go with me.
person_1: She likes u very much.
person_0: Good idea, i'll buy some chocolate for her.

*Ground truth summary (GT)*    702 person_1 and person_0 are going to visit person_1's grandma tonight. person_0 will buy her some chocolate.

*Generated summary (GEN)*    704 person_1 is going to visit her grandma tonight. person_0 will buy chocolate and cake for her.

*Questions/Answers generated on GT*    706

Question: Who will visit person_1's grandma tonight?
Answer: person_1 and person_0
GEN answer: person_1
Similarity: 0.381

Question: Who will buy her some chocolate?
Answer: person_0
GEN answer: person_0
Similarity: 1.0

*Questions/Answers generated on GEN*    708

Question: When will person_1 visit her grandma?
Answer: tonight
GT answer: tonight
Similarity: 1.0

Question: What will person_0 buy for her?
Answer: chocolate and cake
GT answer: chocolate
Similarity: 0.5

*Reward (Average similarity) = (0.381+1+1+0.5)/4 = 0.72*

FIG. 7

ENHANCING NATURAL LANGUAGE PROCESSING ACCURACY IN COMPUTER SYSTEMS

BACKGROUND OF THE INVENTION

The present invention relates generally to the field of abstractive summarization and software development, and more particularly to using question and answering rewards to improve abstractive summarization.

Abstractive Summarization is a task in Natural Language Processing (NLP) that aims to generate a concise summary of a source text. Unlike extractive summarization, abstractive summarization does not simply copy important phrases from the source text but also potentially come up with new phrases that are relevant, which can be seen as paraphrasing. Abstractive summarization yields a number of applications in different domains, from books and literature to science and research and development (R&D), to financial research and legal documents analysis. Thus, they are not restricted to simply selecting and rearranging passages from the original text.

Abstractive methods take advantage of recent developments in deep learning. Since it can be regarded as a sequence mapping task where the source text should be mapped to the target summary, abstractive methods take advantage of the recent success of the sequence to sequence models. These models consist of an encoder and a decoder, where a neural network reads the text, encodes it, and then generates target text. In general, building abstract summaries is a challenging task, which is relatively harder than data-driven approaches such as sentence extraction and involves complex language modeling.

SUMMARY

Embodiments of the present invention disclose a computer-implemented method, a computer program product, and a system for improving abstract summarization with question and answer rewards in a computer system, the computer-implemented method comprising: generating, by a question and answer generator, questions and answers corresponding to a generated summary; evaluating received answers for the generated questions by analyzing received answers associated with the generated summary against answers received for an original summary; calculating a reward based on a similarity between answers associated with the generated summary and the original summary; and updating a generation model by applying the calculated reward to further train the generation model.

BRIEF DESCRIPTION OF THE DRAWINGS

FIG. 3 depicts an exemplary scenario, in accordance with an embodiment of the present invention;

FIG. 5 contains an exemplary algorithm, in accordance with an embodiment of the present invention;

FIGS. 6A-6D depict exemplary tables, in accordance with an embodiment of the present invention;

FIG. 7 an exemplary scenario, in accordance with an embodiment of the present invention.

DETAILED DESCRIPTION

Embodiments of the present invention recognize that neural abstractive summarization models have improved in the recent years. However, the summaries generated by these models generally suffer from issues such as: misidentifying or missing (i.e., not capturing) the critical facts in source documents, and outputting facts in the generated summaries that are inconsistent with the source documents. Embodiments of the present invention recognize that current reward mechanisms in the art do not improve the factual correctness of summaries as the question answering reward frameworks.

Embodiments of the present invention implement a general framework to train abstractive summarization models to alleviate such issues. Embodiments of the present invention improve the art of abstractive summarization and solve the issues outlined above by training a sequence-to-sequence model to summarize documents, and further train the sequence-to-sequence model in a Reinforcement Learning (RL) setting with question-answering based rewards. Further, embodiments of the present invention improve the art by evaluating the summaries generated by the general framework using multiple automatic measures and human judgements. The experimental results, described below, show that the question-answering rewards can be used as a general framework to improve neural abstractive summarization. Particularly, the results from human evaluations show that the summaries generated by embodiments of the present invention are preferred over 30% more over the summaries generated by general abstractive summarization models currently in the art.

Implementation of embodiments of the invention may take a variety of forms, and exemplary implementation details are discussed subsequently with reference to the Figures (i.e., FIG. 1A-FIG. 8).

Figure 1A:
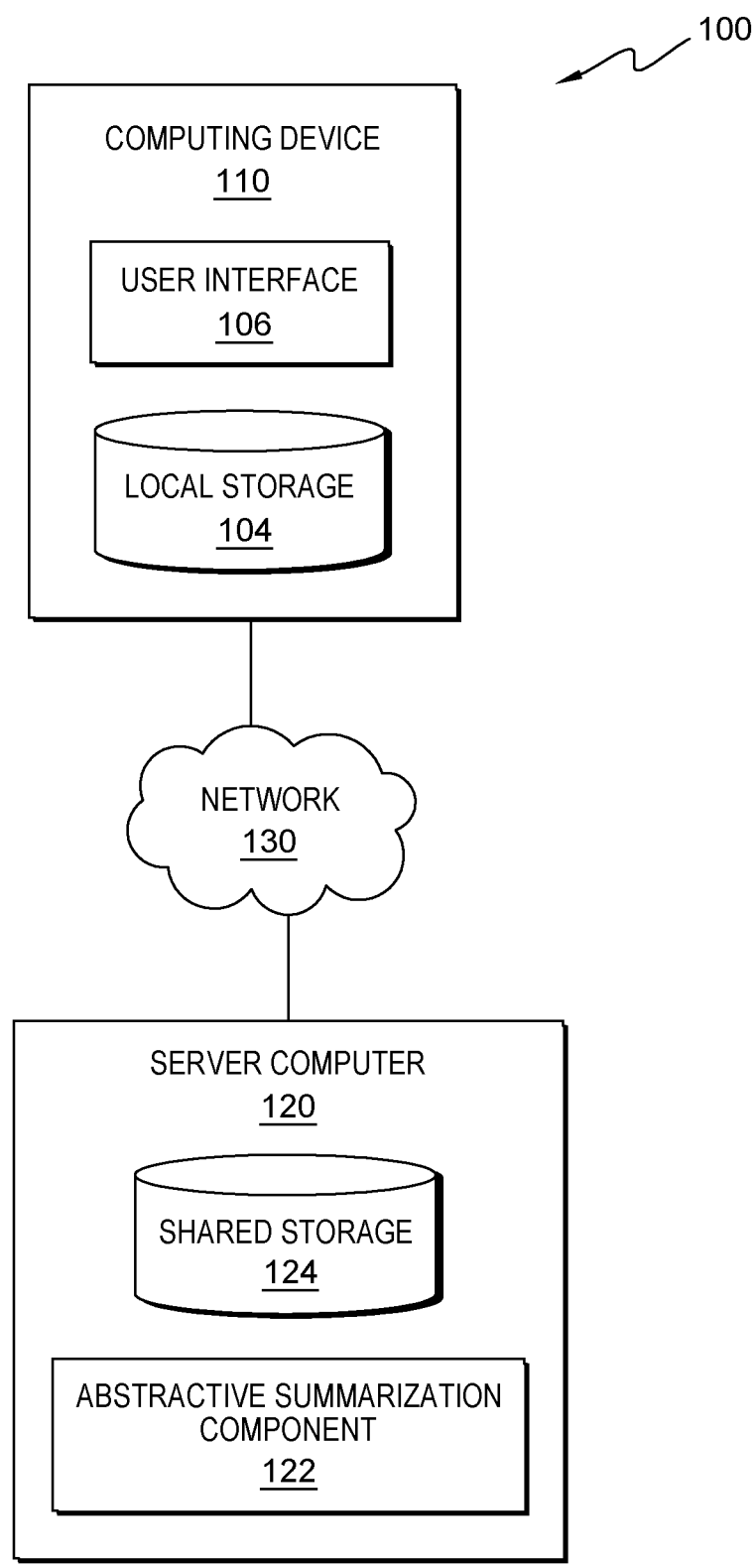
FIG. 1A is a functional block diagram illustrating a distributed data processing environment, in accordance with an embodiment of the present invention.

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 8.

User interface (interface) 106 provides an interface to abstractive summarization component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 8 In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 8. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG.

1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

In various embodiments of the present invention, not depicted in FIG. 1A, knowledge corpus 128 may each execute on a plurality of server computers 120 and/or on a plurality of computing devices 110. In some embodiments, and knowledge corpus 128 may each be located and/or executed anywhere within distributed data processing environment 100 as long as knowledge corpus 128 are connected to and/or communicates with, computing device 110, component 122, and/or server computer 120, via network 130.

Component 122 may alleviate factuality related issues and improve the quality of the abstractive summarization by using question-answering (QA) based rewards. First, component 122 may train a sequence-to-sequence (seq2seq) summary generation model to take a document as the input and generate a summary as the output. Additionally, component 122 may improve the precision and recall of the summary generation model using a QA framework as follows. To improve the precision of the model, component 122 may generate questions and corresponding answers for each generated summary. In various embodiments, component 122 outputs the generated questions and corresponding answers to a user. In various embodiments, component 122 displays, via interface 106 on computing device 110, responsive prompts to the user comprising the generated questions and answers that enable a user to select or input a response (e.g., answer). For example, component 122 displays one or more responsive prompts to the user that prompt the user to select a predetermined answer (e.g., multiple choice) or input a response (e.g., essay/short answer response) and/or prompts the user to confirm and save selection of the user to local storage 104 and/or shared storage 124. In some embodiments, the response from the user is confirmed and/or stored automatically. In various embodiments, component 122 generates and outputs, via interface 106, responsive prompts that query the user to accept and/or rate the generated/output questions and answers, wherein responsive to receiving feedback from a user, component 122 updates the generated questions and answers based on the received user feedback and/or stores the user feedback and generated questions and answers for future use to local storage 104 and/or shared storage 124.

Component 122 may evaluate the received answers for the same or similar questions associated with the ground truth summaries. In various embodiments, if a generated summary contains factually incorrect information, which would result in having different answers from the ground truth summary for some of the generated questions, then component 122 will label the generates summary as irrelevant or non-factual. Component 122 may use the similarity of answers to calculate a reward to improve precision of the summary generation model. Similarly, to improve the recall of the summarization model, component 122 may generate questions and corresponding answers from the ground truth summaries and evaluate the answers component 122 obtains/receives for the same questions from the generated summaries. If the generated summary does not contain some key information as captured in the ground truth summary, then this would lead to having different answers from the ground truth summary for some of the generated questions. Component 122 may use the similarity of answers to calculate a reward to improve the recall. In various embodiments, component 122 may implement the calculated rewards in a Reinforcement Learning (RL) based framework to improve the summary generation model, wherein the textual similarity between the answers are taken as the reward, as illustrated in FIG. 7. Component 122 may evaluate the summaries generated by our approach using multiple automatic measures and human judgements, and show that the QA can be used as a general framework to improve abstractive summarization.

Figure 1B:
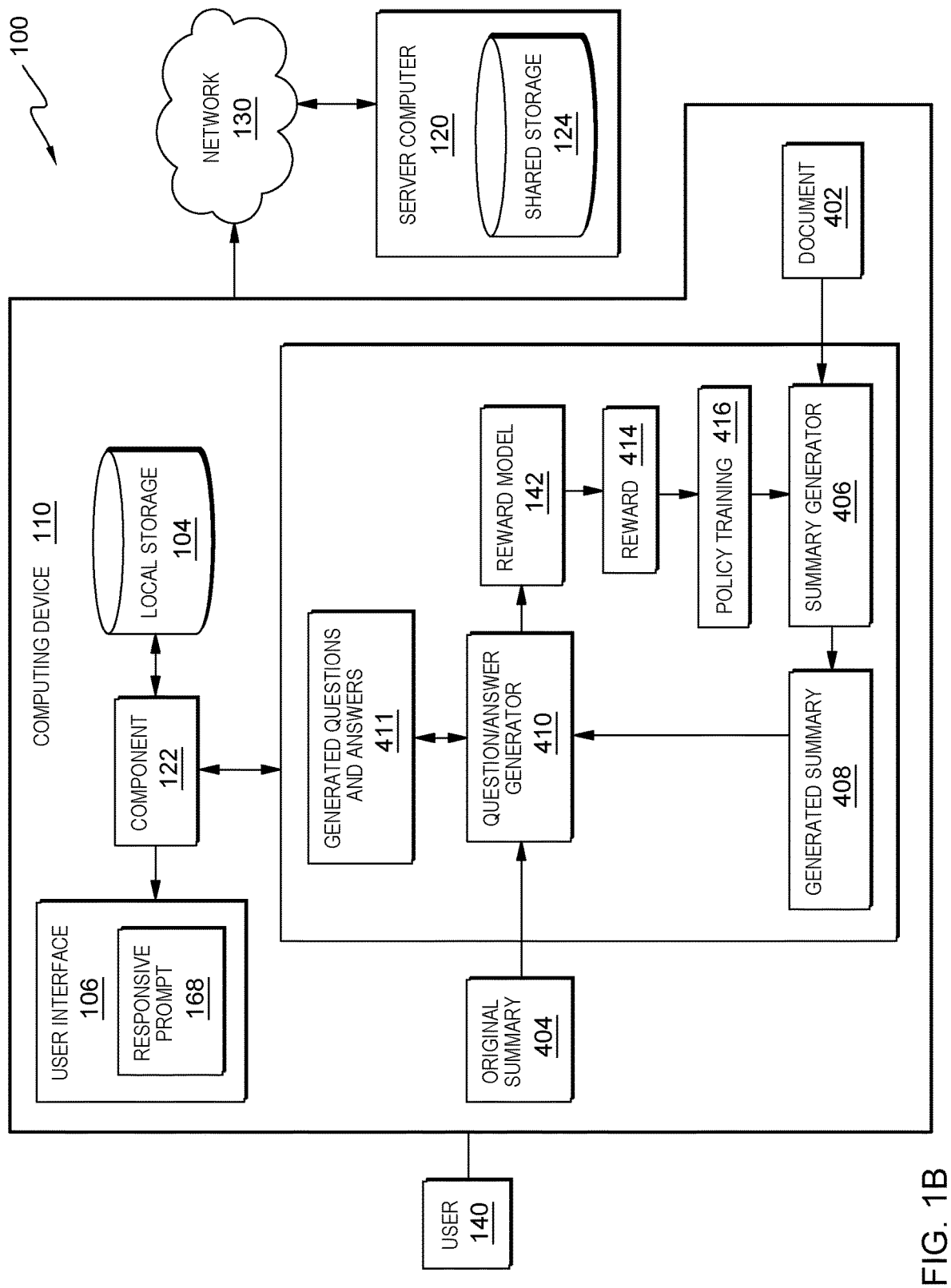
FIG. 1B is a functional block diagram illustrating a distributed data processing environment of an abstract summarization component, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, user 140, and server computer 120 interconnected over network 130.

In the depicted embodiment, summary generator 406 receives and/or retrieves document 402, wherein document 402 may be any document containing textual information known and understood in the art. In various embodiments, summary generator 406 may receive document 402 from a user input via interface 106, or retrieve document 402 from local storage 104 and/or shared storage 124 automatically or based on user instructions received through interface 106. Summary generator 406 generates generated summary 408 based on the retrieved and/or received document 402. Further, in the depicted embodiment, question/answer (QA) generator 410 receives generated summary 408 and original summary 404 and generates questions and corresponding answers to the generated questions (i.e., generated questions and answers 411) based on the received generated summary 408 and original summary 404. In various embodiments, QA generator 410 receives original summary 404 from a user input via interface 106, or retrieves original summary 404 from local storage 104 and/or shared storage 124 automatically or based on user instructions received through interface 106. QA generator may receive original summary 404 and generated summary 408 automatically through predetermined instructions from component 122 and/or receive instructions from component 122 to retrieve generated summary from summary generator 406 and retrieve original summary 404 from local storage 104, shared storage 124, and/or user 140, via responsive prompt 168 and interface 106.

In the depicted embodiment, component 122 outputs generated questions and answers 411 to user 140, via responsive prompt 168 on interface 106. In various embodiments, responsive to receiving one or more responses to the output generated questions and answers 411, component 122, via reward model 142 evaluates the received answers for generated questions and answers 411 by analyzing received answers associated with generated summary 408 against answers received for original summary 404. Reward model 142 may calculate a reward based on the similarity between answers associated with generated summary 408 and original summary 404. In various embodiments, if the calculated similarity is within or above a predetermined threshold then reward model 142 generates and outputs reward 414. In various embodiments, policy training 416 updates the generation model, via summary generator 406, by applying the calculated reward (reward 414) to further train summary generation model (summary generator) 406.

Figure 2:
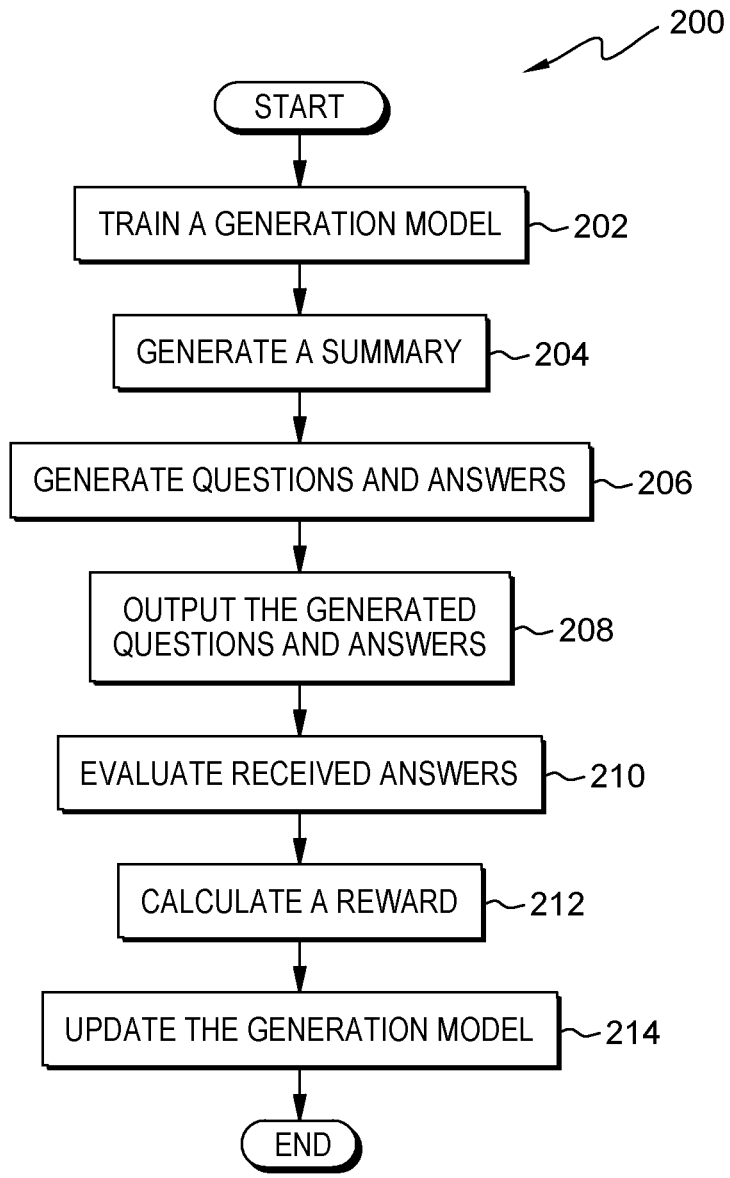
FIG. 2 illustrates operational steps of the abstract summarization component, on a server computer within the distributed data processing environment of FIG. 1A, for improving abstract summarization with question and answer rewards in a computer system, in accordance with an embodiment of the present invention.

FIG. 2 illustrates operational steps of component 122, generally designated 200, in communication with server computer 120, within distributed data processing environment 100 of FIG. 1A and/or FIG. 1B, for improving abstract summarization with question and answer rewards, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 trains a generation model. In various embodiments, component 122 trains one or more generation models. Component 122 may train a sequence-to-sequence (seq2seq) summary generation model (i.e., generation model) to take a document as the input and may generate a summary as the output. In various embodiments, component 122 trains the generation model to receive documents as input from a user through interface 106 on computing device 110 and/or automatically and/or direction from computing device 110, via local storage 104 and/or shared storage 124. For example, receiving a document upload from a user through a computer or automatically retrieving documents from a predetermined folder on the computer's hard drive.

In step 204, component 122 generates a summary. In various embodiments, component 122 generates a summary based on the received documents. Component 122 may output the generated summary to a user, via interface 106. In various embodiments, component 122 may generate questions and corresponding answers for one or more generated summary.

In step 206, component 122 generates questions and answers. In various embodiments, component 122 generates one or more questions and answers. Component 122 displays, via interface 106 on computing device 110, responsive prompts to the user comprising the generated questions and answers that enable a user to select or input a response (e.g., answer). For example, component 122 displays one or more responsive prompts to the user that prompt the user to select a predetermined answer (e.g., multiple choice) or input a response (e.g., essay/short answer response) and/or prompts the user to confirm and save selection of the user to local storage 104 and/or shared storage 124.

In step 208, component 122 outputs the generated questions and answers. In various embodiments, component 122 displays, via interface 106 on computing device 110, responsive prompts to the user comprising the generated questions and answers that enable a user to select or input a response (e.g., answer). For example, component 122 displays one or more responsive prompts to the user that prompt the user to select a predetermined answer (e.g., multiple choice) or input a response (e.g., essay/short answer response) and/or prompts the user to confirm and save selection of the user to local storage 104 and/or shared storage 124.

In step 210, component 122 evaluates the received answers. In various embodiments, component 122 evaluates the received answers from one or more users. Component 122 may evaluate the answers component 122 obtains/receives for the same questions from the generated summaries. If the generated summary does not contain some key information as captured in the ground truth summary, then this would lead to having different answers from the ground truth summary for some of the generated questions. In various embodiments, component 122 may evaluate the summaries generated by our approach using multiple automatic measures and human judgements, and show that the QA can be used as a general framework to improve abstractive summarization.

In step 212, component 122 calculates a reward. In various embodiments, component 122 calculates one or more rewards based on the evaluation of the received answers. Component 122 may use the similarity of answers to calculate a reward to improve the recall. In various embodiments, component 122 may implement the calculated rewards in a Reinforcement Learning (RL) based framework to improve the summary generation model.

In step 214, component 122 updates the generation model. In various embodiments, component 122 updates the generation model based on the calculated reward and evaluation of the received answers.

FURTHER COMMENTS AND/OR EMBODIMENTS

Some embodiments of the present invention recognize the following facts, potential problems, and/or potential areas for improvement with respect to the current state of the art.

Embodiments of the present invention recognize that neural abstractive summarization models have drastically improved in the recent years. However, the summaries generated by these models generally suffer from issues such as: not capturing the critical facts in source documents, and containing facts that are inconsistent with the source documents. In this work, embodiments of the present invention present a general framework to train abstractive summarization models to alleviate such issues. Embodiments of the present invention first train a sequence-to-sequence model to summarize documents, and then further train this model in a Reinforcement Learning setting with question-answering based rewards. Embodiments of the present invention evaluate the summaries generated by this framework using multiple automatic measures and human judgements. The experimental results show that the question-answering rewards can be used as a general framework to improve neural abstractive summarization. Particularly, the results from human evaluations show that the summaries generated by our approach is preferred over 30% of the time over the summaries generated by general abstractive summarization models.

1 INTRODUCTION

Although neural abstractive summarization has seen drastic improvements over the recent years, embodiments of the present invention recognize that these systems still have multiple drawbacks. One such common draw-back is that the generated summaries frequently fail to capture critical facts in source documents (low recall). On the other hand, embodiments of the present invention recognize that neural abstractive summarization models are known to generate content which are inconsistent with the source document (low precision). This is also commonly known as hallucination. Some studies claim that nearly 30% of the outputs of a summarization models suffer from this problem.

FIG. 3 shows a source document, the ground truth summary and few summaries generated by neural models. In the Generated Summary 1, the model fails to capture some crucial facts in the original document (e.g., the play is being a translated not performed by Charlee). The original document is the source document, for which the summary is generated. In Generated Summary 2, the model successfully identifies the fact that the play is a translated, however incorrectly mentions that both Charlee and Curtis are performing when Charlee is the only one preparing for the play. Such factuality related issues are common in neural abstractive summarization models, which makes the models hardly usable in real-world applications. In Generated Summary 3, embodiments of the present invention outputs a more accurate summary of the original dialog when compared to Generated Summary 1 and 2.

In this work, embodiments of the present invention propose a general framework to alleviate factuality related issues and improve the quality of the abstractive summarization by using question-answering (QA) based rewards. First, embodiments of the present invention train a sequence-to-sequence (seq2seq) summary generation model to take a document as the input and generate a summary as the output. Next, embodiments of the present invention improve the precision and recall of the summary generation model using a QA framework as follows. To improve the precision of the model, embodiments of the present invention first generate questions and corresponding answers for each generated summary. Next, embodiments of the present invention evaluate the answers that embodiments of the present invention get for the same questions from the ground truth summaries. If a generated summary contains factually incorrect information, then this will result in having different answers from the ground truth summary for some of the generated questions.

Embodiments of the present invention use the similarity of answers to calculate a reward to improve the precision. Similarly, to improve the recall of the summarization model, embodiments of the present invention generate questions and corresponding answers from the ground truth summaries and evaluate the answers embodiments of the present invention obtain for the same questions from the generated summaries. If the generated summary does not contain some key information as captured in the ground truth summary, then this would lead to having different answers from the ground truth summary for some of the generated questions. Embodiments of the present invention use the similarity of answers to calculate a reward to improve the recall. The calculated rewards were used in a Reinforcement Learning (RL) based framework to improve the summary generation model. In FIG. 3 embodiments of the present invention show an example output from our approach, which does not contain the factuality related issues shown above. Embodiments of the present invention evaluate the summaries generated by our approach using multiple automatic measures and human judgements, and show that the QA can be used as a general framework to improve abstractive summarization.

In summary, our key contributions are: (1) embodiments of the present invention introduce a Reinforcement Learning framework, which uses QA rewards to improve the recall and precision of abstractive summarization. (2) The framework is evaluated on three commonly used transformer based summarization models on two public datasets. (3) The evaluation of generated summaries on several automatic measures and human judgements show the effectiveness of our method. In particular, the human judges prefer summaries generated by our approach more than 30% of the time over the summaries generated by general abstractive summarization models.

2 IMPROVING SUMMARIZATION WITH QA REWARDS

Figure 4:
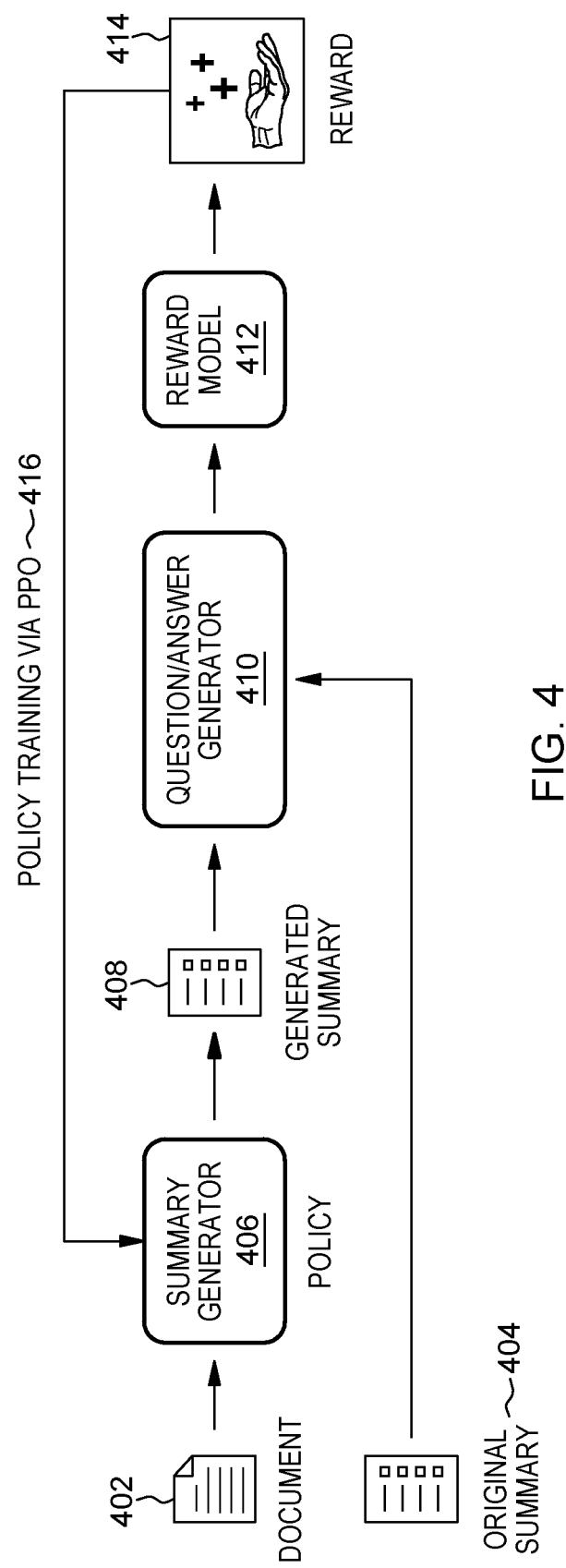
FIG. 4 contains operational steps of the abstract summarization component, for training the summarization framework using QA rewards, in accordance with an embodiment of the present invention.

In general, abstractive summarization models are trained to minimize the cross entropy loss of the reference summary at the word level, which does not necessarily reward models for being factually accurate with high precision and recall. Hence, to improve the factually accuracy of abstractive summarization, component 122 executes a general framework which uses QA based rewards and RL based training. Component 122 executing the proposed framework is illustrated in FIG. 4. FIG. 4 comprises document 402, original summary 404, summary generator 406 (i.e., a policy), generated summary 408, QA generator 410, reward model 412, and reward 412. In the depicted embodiment, summary generator 406 receives document 402 and generates generated summary 408 based on the received document 402. Further, QA generator 410 receives generated summary 408 and original summary 404 and generates questions and answers based on the received generated summary 408 and original summary 404.

In regard to summary generator 406, embodiments of the present invention recognizes that recent work in the art has leveraged pretrained Transformer models for abstractive summarization. In various embodiments, component 122, via summary generator 406, as the first step of summary generation, component 122 trains a transformer based seq2seq model (S), where the source document is fed as the input and the model is trained to generate the summary token-by-token. The model is trained to optimize cross entropy loss. During inference, component 122 may use top-p nucleus sampling with p=0.95.

QA Generator 410 is utilized to generate questions and answers from original summary 404 and generated summary 408. Component 122, via QA generator 410, generates questions and corresponding answers from original summary 404 and evaluates the answers obtained for the generated questions associated with original summary 404 by analyzing (e.g., comparing) them against the answers received from generated summary 408. Similarly, component 122 may generate questions and corresponding answers from generated summary 406 and may evaluate the obtained answers by analyzing (e.g., comparing) the received questions associated with generated summary 406 with the questions and answers received/obtained from original summary 408. The functionality of the QA framework is explained in Algorithm 500 depicted in FIG. 5. To generate questions and corresponding answers, component 122 may use an answer aware question generation model finetuned on t5-base model. In FIG. 5, Algorithm 500 represents the algorithm for the question and answer (QA) framework for factuality reward calculation. The input for Algorithm 500 comprises: trained summarization model (S), Question-Answer Generation Model (QA), Answer Generation Model (A), Input Document (D), Ground Truth Summary (Gt), and Textual Similarity Function (T), wherein the output for Algorithm 500 comprises: Reward value (R) for Generated Summary (Ga).

To identify the answer for a generated question from a summary, embodiments of the present invention use an extractive QA model trained on the SQUAD task. In regard to reward model 412, component 122, via reward model 412, may use the similarity between the answers obtained by generated summary 408 and the ground truth summary (e.g., original summary 404) as the reward function. Generated summary 408 is considered relevant if the questions posed by the ground truth summary (e.g., original summary 404)

can be answered correctly by generated summary 408, as this shows the critical information queried by the question is present in generated summary 408. Similarly, generated summary 408 is considered factual if a question generated on generated summary 408 can be correctly answered original summary 404, as the questions generated on a hallucinated summary will not be correctly answered by original summary 404. Component 122 may use the Normalized Levenshtein distance as the similarity measure. An example for using QA for reward calculation is provided in Section 5 below and FIG. 7. The reward obtained from Algorithm 500 is used in the reinforcement learning (RL) framework (shown in FIG. 4) to further train the summary generation model S.

In regard to policy training 416, component 122, via policy training 416, use proximal policy optimization (ppo) as the optimizer for the policy training, as it prevents the generator from moving too far away from the pretrained language model. Embodiments of the present invention recognize that the approach of QA based optimization following general seq2seq training, described above, enables the described framework to be applicable across different abstractive summarization models.

3 EVALUATION AND RESULTS

Component 122 may evaluate the QA based summarization framework on three common neural abstractive summarization models GPT-2, BART, and PEGASUS and on two different abstractive summarization datasets: (1) XSUM: consists of 227 k news articles covering a wide variety of subjects along with human written single-sentence summaries, and (2) SAMSUM: conversation summarization dataset, containing over 13 k open-domain conversations and summaries created by humans. Component 122 may evaluate each model, first, with general method of training: generate the summary given the document, then, with further RL based training with QA rewards that embodiments of the present invention propose. The hyper-parameters used in training are available in the Sections 4-4.4 below.

In relation to evaluations with ROUGE scores, component 122 may first evaluate the models using the ROUGE scores. The obtained results are reported in FIGS. 6A and 6B. Each table in FIG. 6A and FIG. 6B contains two sections, where the first section shows the accuracy before training with QA based rewards, and the second section shows the results after RL based training with QA rewards. The results clearly suggest that for both datasets, each model improves its summarization accuracy using our QA framework.

In regard to factuality based evaluations, in various embodiments, component 122 evaluates the results obtained from our models in a factuality based evaluation framework. This measure provides better correlation with human judgments over four evaluation dimensions (consistency, coherence, fluency, and relevance), and provides precision, recall and F1 for a generated summary given a reference, wherein F1 is the harmonic mean of the precision and recall. The results obtained on the two datasets are shown in FIG. 6C. Similarly, to the ROUGE based evaluation, the results here clearly indicate that for both datasets, each model improves its accuracy using our QA framework.

In relation to human evaluation, component 122 may further conducted human evaluations to study the quality of the models. Component 122 may focus on the two models that obtained the best scores in our automatic evaluations: Pegasus and BART, and compared the quality of summaries between the original model to our model optimized with QA rewards. In the depicted embodiments, component 122 followed the evaluation protocol, in which annotators were presented with a document, a ground truth summary and a model summary and asked to make two decisions: (1) which model summary is more factual consistent with the given document, and (2) which model summary is of a higher quality, taking into account Informativeness, Fluency, and Succinctness. Annotators were presented with the models summaries, in a randomized order, and were instructed to select one of them or indicate that both are equally good or bad.

For this assessment component 122 first randomly sampled 30 records from the test sets of SAMSUM and XSUM (overall 60 records). Then, component 122 generated 4 types of summaries: Pegasus, Pegasus-QA, BART, BART-QA. To achieve a high quality standard embodiments of the present invention recruited 6 NLP experts, and collected three human judgments for each summary. To obtain a single score per summary, component 122 took the majority vote of the collected assessments. FIG. 6D describes the results of this assessment. The values represent the number of times that a model was selected as strictly better than its counterpart out of 30 annotated summaries. Differences between QA based reward generation model to the original model is statistically significant (with $p<0.05$). These results indicate that QA based rewards helps to significantly improve summary generation model, considering both factual consistency and general quality aspects.

4 MODEL TRAINING AND HYPERPARAMETER DETAILS

In this section, embodiments of the present invention elaborate the training processes and the hyperparameters used by the models used in this study. Each experiment was run on 2 V100 GPUs (on a single machine).

4.1 GPT2 Model

Embodiments of the present invention fine-tune a GPT-2 language model for this task by using the implementation available at HuggingFace. The hyperparameters used during training and inference are shown below in language model hyperparameters. The model takes around 3 hours to train for the SAMSUM data and approximately 24 hours to train on the XSUM data. Embodiments of the present invention finetune this on XSUM and SAMSUM datasets in respective applications. Language model hyperparameters for HuggingFace comprise:
    model_name: gpt2;
    per_gpu_train_batch_size: 4;
    per_gpu_eval_batch_size: 4;
    gradient_accumulation_steps: 4;
    learning_rate: 6.25e-5;
    adam_epsilon: 1e-8;
    max_grad_norm: 1.0;
    num_train_epochs: 10;
    warmup_steps: 500; and
    max_input_tokens: 512.

4.2 BART Model

Embodiments of the present invention used a BART model (Lewis et al., 2019) provided by HuggingFace library, which is fine-tuned on the extreme summarization (XSUM) task. During the evaluation with SAM-SUM dataset, embodiments of the present invention further fine-tune this model on SAMSUM data. This model takes around 6 hours to finetune on the SAMSUM data. The code used for the fine-tuning is publicly available. The hyper-parameters used for training the BART model are as follows:

train_batch_size=4;
    eval_batch_size=4;
    num_train_epochs=10;
    model_name=facebook/bart-large-xsum;
    learning_rate=3e-5;
    val_check_interval=0.1;
    max_source_length=512; and
    max_target_length=80.

4.3 PEGASUS Model

Similar to the BART experiments, embodiments of the present invention use a PEGASUS model provided by HuggingFace library, which is fine-tuned on the extreme summarization (XSUM) task. During the evaluation with SAMSUM dataset, embodiments of the present invention further fine-tune this model on SAMSUM data. This model takes around 7 hours to finetune on the SAMSUM data. The code used for the fine-tuning is publicly available. The hyperparameters used for training the PEGASUS model are as follows:

train_batch_size=4;
    eval_batch_size=4;
    num_train_epochs=10;
    model_name=google/pegasus-xsum;
    learning_rate=3e-5;
    val_check_interval=0.1;
    max_source_length=512; and
    max_target_length=80.

4.4 Reinforced Learning Model with QA Rewards

Embodiments of the present invention adapted a publicly available Proximal Policy Optimization (PPO) implementation 9 for the RL model with QA rewards. The model was trained for 10000 steps and takes around 12 hours to train. Following hyper-parameters were used to train the model, as follows:

steps: 100000;
    batch_size: 16;
    forward_batch_size: 4;
    learning_rate: 1.41e-5;
    init_kl_coef:0.2;
    target: 6;
    horizon:10000;
    gamma:1;
    lam:0.95;
    cliprange: 0.2;
    cliprange_value: 0.2; and
    vf_coef: 0.1.

5 EXAMPLE—REWARD CALCULATION WITH QUESTION-ANSWERS

In FIG. 7, embodiments of the present invention provide an example for calculating rewards with QA. The figure first shows a document, which is represented by original document (i.e., dialog) 700, with its corresponding ground truth (GT) summary 702 and abstractive summary generated (GEN) 704 by the BART based summarization model. Then the next section shows the QA pairs generated by the GT summary 706 and the answers obtained by the GEN summary for the same questions. For example, for the question 'Who will visit person_1's grandma tonight?', the answer from the GT summary is 'person_1 and person_0' while the answer from the GEN summary is only 'person_1'. Since the model failed to capture the fact that both persons will be visiting grandma, the model will receive a lower reward for this case, as shown by the similarity score (i.e., similarity). In another example, for the question 'Who will buy her some chocolate?', the answer from the GT summary is 'person_0', which is the answer from the GEN summary. Thus, the answer from the GT summary and GEN summary are a match, resulting in a similarity score (similarity) of 1.0. The next section, of the depicted embodiment, shows the questions and answers generated from the GEN summary 708. For example, In another example, for the question 'What will person_0 buy for her?', the GEN summary produces the answer 'chocolate and cake' while the GT summary produces 'chocolate' as the answer. This mismatch occurs since GEN summary has some hallucinated content (cake), and this will be penalized with a lower reward during the RL model training.

6 CONCLUSION

In various embodiments, the problem of low recall and precision of factuality in neural abstractive summarization models was investigated and a proposed framework to alleviate the identified problems above by using question-answering (QA) based rewards. The proposed framework is evaluated on three commonly used transformer based summarization models and on two publicly avail-able datasets. The automatic evaluations were performed using ROUGE scores as well as question answering based evaluation framework and the results suggest that the proposed method improves the summarization accuracy and factuality. The human evaluation on the generated summaries also suggest that our approach produces summaries with significantly high factual consistency and quality.

FIG. 3 contains exemplary scenario, in accordance with an embodiment of the present invention. More specifically, FIG. 3 illustrates a document, its corresponding ground truth summary, and model generated summaries, in accordance with an embodiment of the present invention.

FIG. 4 contains operational steps of component 122, on a server computer within the distributed data processing environment of FIG. 1A, for training the summarization framework using QA rewards, in accordance with an embodiment of the present invention.

FIG. 5 contains exemplary algorithm 500, in accordance with an embodiment of the present invention.

FIG. 6A contains exemplary table 602 describing abstractive summarizers on SAMSUM, in accordance with an embodiment of the present invention.

FIG. 6B contains exemplary table 604 describing abstractive summarizers on XSUM, in accordance with an embodiment of the present invention.

FIG. 6C contains exemplary table 606 describing the results of a QA based evaluation, in accordance with an embodiment of the present invention.

FIG. 6D contains exemplary table 608 describing the results of human evaluation, in accordance with an embodiment of the present invention.

FIG. 7 contains exemplary scenario, in accordance with an embodiment of the present invention. More specifically, FIG. 7 illustrates an example of reward calculation with Question-Answer pairs.

Figure 8:
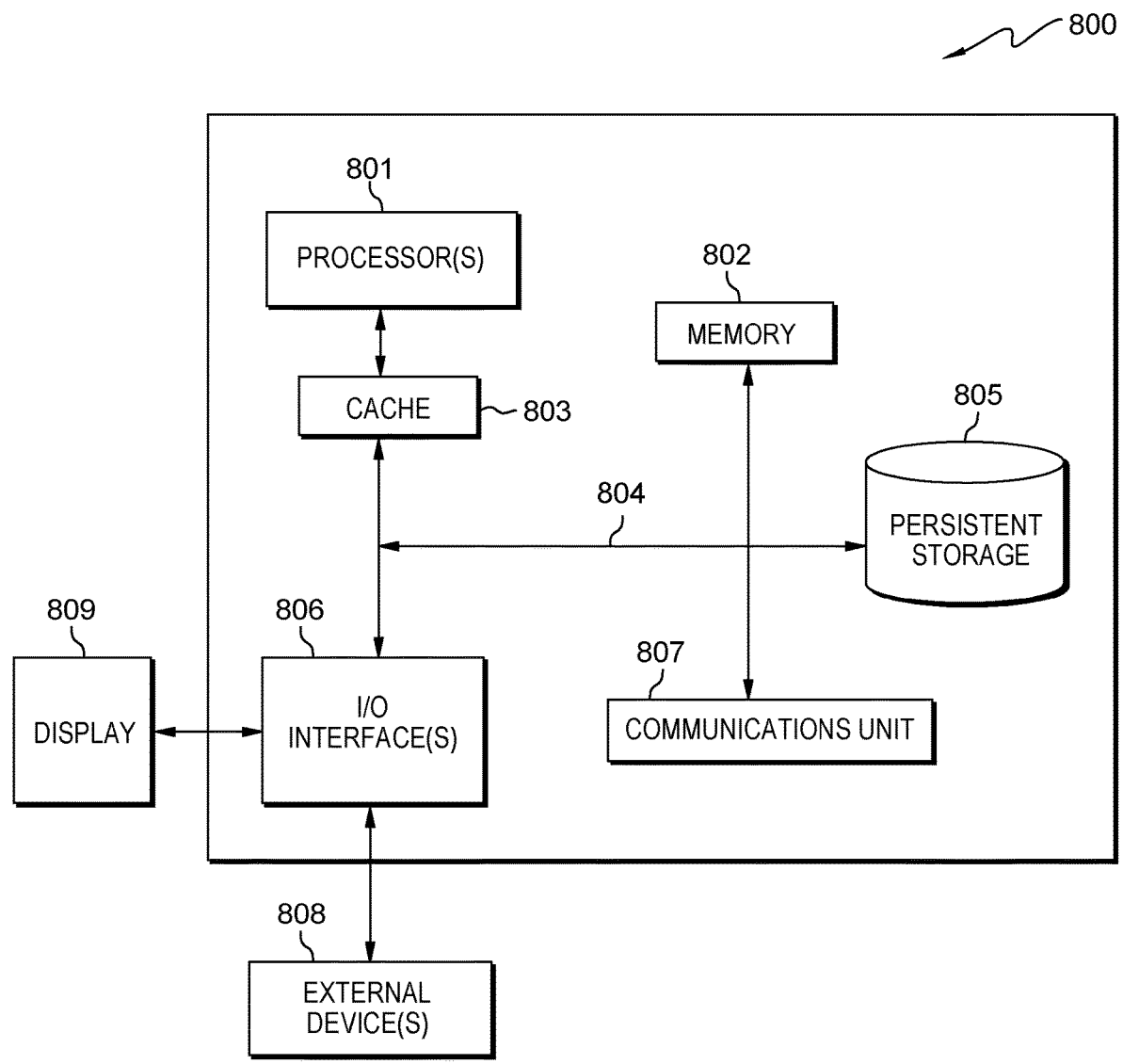
FIG. 8 depicts a block diagram of components of the server computer executing the abstract summarization component within the distributed data processing environment of FIG. 1A, in accordance with an embodiment of the present invention.

FIG. 8 depicts a block diagram of components of server computer 120 within distributed data processing environment 100 of FIG. 1A and/or FIG. 1B, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

FIG. 8 depicts computer system 800, where server computing 120 represents an example of computer system 800 that includes component 122. The computer system includes processors 801, cache 803, memory 802, persistent storage 805, communications unit 807, input/output (I/O) interface(s) 806, display 809, external device(s) 808 and communications fabric 804. Communications fabric 804 provides communications between cache 803, memory 802, persistent storage 805, communications unit 807, and input/output (I/O) interface(s) 806. Communications fabric 804 may be implemented with any architecture designed for passing data and/or control information between processors (such as microprocessors, communications, and network processors, etc.), system memory, peripheral devices, and any other hardware components within a system. For example, communications fabric 804 may be implemented with one or more buses or a crossbar switch.

Memory 802 and persistent storage 805 are computer readable storage media. In this embodiment, memory 802 includes random access memory (RAM). In general, memory 802 may include any suitable volatile or non-volatile computer readable storage media. Cache 803 is a fast memory that enhances the performance of processors 801 by holding recently accessed data, and data near recently accessed data, from memory 802.

Program instructions and data used to practice embodiments of the present invention may be stored in persistent storage 805 and in memory 802 for execution by one or more of the respective processors 801 via cache 803. In an embodiment, persistent storage 805 includes a magnetic hard disk drive. Alternatively, or in addition to a magnetic hard disk drive, persistent storage 805 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 805 may also be removable. For example, a removable hard drive may be used for persistent storage 805. Other examples include optical and magnetic disks, thumb drives, and smart cards that are inserted into a drive for transfer onto another computer readable storage medium that is also part of persistent storage 805.

Communications unit 807, in these examples, provides for communications with other data processing systems or devices. In these examples, communications unit 807 includes one or more network interface cards. Communications unit 807 may provide communications through the use of either or both physical and wireless communications links. Program instructions and data used to practice embodiments of the present invention may be downloaded to persistent storage 805 through communications unit 807.

I/O interface(s) 806 enables for input and output of data with other devices that may be connected to each computer system. For example, I/O interface 806 may provide a connection to external devices 808 such as a keyboard, keypad, a touch screen, and/or some other suitable input device. External devices 808 may also include portable computer readable storage media such as, for example, thumb drives, portable optical or magnetic disks, and memory cards. Software and data used to practice embodiments of the present invention may be stored on such portable computer readable storage media and may be loaded onto persistent storage 805 via I/O interface(s) 806. I/O interface(s) 806 also connect to display 809.

Display 809 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving abstract summarization with question and answer rewards in a computer system, the computer-implemented method comprising:
    generating, by a question and answer generator, questions and answers corresponding to a generated abstractive summary, wherein the generated abstractive summary is generated by a summary generator, wherein the summary generator comprises a transformer based sequence-to-sequence model(S) that is trained to receive a source document as an input and generate the abstractive summary token-by-token based on the input, and wherein an extractive questions and answer model is utilized to identify an answer to the generated questions and answers;
    evaluating received answers for the generated questions by analyzing received answers associated with the generated abstractive summary against answers received for an original summary;
    generating and outputting, through a user interface, responsive prompts that query a user to accept and rate the generated questions and answers associated with the generated abstractive summary;
    calculating a reward based on a similarity between answers associated with the generated abstractive summary and the original summary;
    responsive to the calculated similarity being above a predetermined threshold, generating and outputting a reward;
    utilizing proximal policy optimization as an optimizer for policy training to prevent the summary generator from moving a predetermined distance from a pretrained language model; and
    updating the extractive questions and answer model by utilizing the policy training to apply the calculated reward to further train the summary generator.

2. The computer-implemented method of claim 1, further comprising:
    training the generation model to receive a document as input, wherein the model is trained to optimize cross entropy loss; and
    receiving, by an interface, the document to parse for textual information.

3. The computer-implemented method of claim 1, wherein the generation model is a sequence-to-sequence summary generation model.

4. The computer-implemented method of claim 1, further comprising:
generating, by a summary generator, the generated abstractive summary based on a received document, wherein the generated abstractive summary is a summary encompassing text of the received document, and wherein the generated abstractive summary is considered relevant when the questions posed by the generated summary are answered correctly.

5. The computer-implemented method of claim 1, further comprising:
displaying, by an interface, a responsive prompt to a user, wherein the responsive prompt comprises the generated questions and answers that enable the user to input a response;
responsive to receiving one or more responses to the generated questions and answers, evaluating, by a reward model, the received one or more responses to the generated questions.

6. The computer-implemented method of claim 1, further comprising:
implementing the calculated rewards in a Reinforcement Learning (RL) based framework to train the summary generation model, wherein the textual similarity between the answers are taken as the reward.

7. The computer-implemented method of claim 1, further comprising:
evaluating the generated summary through multiple automatic measures, wherein the automatic measures are predetermined, and wherein the automatic measures are performed using ROUGE scores as well as question answering based evaluation framework.

8. A computer system for improving abstract summarization with question and answer rewards in a computer system, the computer system comprising:
one or more computer processors;
one or more computer readable storage devices;
program instructions stored on the one or more computer readable storage devices for execution by at least one of the one or more computer processors, the stored program instructions comprising:
program instructions to generate, by a question and answer generator, questions and answers corresponding to a generated abstractive summary, wherein the generated abstractive summary is generated by a summary generator, wherein the summary generator comprises a transformer based sequence-to-sequence model(S) that is trained to receive a source document as an input and generate the abstractive summary token-by-token based on the input, and wherein an extractive questions and answer model is utilized to identify an answer to the generated questions and answers;
program instructions to evaluate received answers for the generated questions by analyzing received answers associated with the generated abstractive summary against answers received for an original summary;
program instructions to generate and output, through a user interface, responsive prompts that query a user to accept and rate the generated questions and answers associated with the generated abstractive summary;
program instructions to calculate a reward based on a similarity between answers associated with the generated abstractive summary and the original summary;
responsive to the calculated similarity being above a predetermined threshold, program instructions to generate and output a reward;
program instructions to utilize proximal policy optimization as an optimizer for policy training to prevent the summary generator from moving a predetermined distance from a pretrained language model; and
program instructions to update the extractive questions and answer model by utilizing the policy training to apply the calculated reward to further train the summary generator.

9. The computer system of claim 8, further comprising:
program instructions to train the generation model to receive a document as input, wherein the model is trained to optimize cross entropy loss; and
program instructions to receive, by an interface, the document to parse for textual information.

10. The computer system of claim 8, wherein the generation model is a sequence-to-sequence summary generation model.

11. The computer system of claim 8, further comprising:
program instructions to generate, by a summary generator, the generated abstractive summary based on a received document, wherein the generated abstractive summary is a summary encompassing text of the received document, and wherein the generated abstractive summary is considered relevant when the questions posed by the generated summary are answered correctly.

12. The computer system of claim 8, further comprising:
program instructions to display, by an interface, a responsive prompt to a user, wherein the responsive prompt comprises the generated questions and answers that enable the user to input a response;
responsive to receiving one or more responses to the generated questions and answers, evaluating, by a reward model, the received one or more responses to the generated questions.

13. The computer system of claim 8, further comprising:
program instructions to implement the calculated rewards in a Reinforcement Learning (RL) based framework to train the summary generation model, wherein the textual similarity between the answers are taken as the reward.

14. The computer system of claim 8, further comprising:
program instructions to evaluate the generated summary through multiple automatic measures, wherein the automatic measures are predetermined, and wherein the automatic measures are performed using ROUGE scores as well as question answering based evaluation framework.

15. A computer program product for improving abstract summarization with question and answer rewards in a computer system, the computer program product comprising:
one or more computer readable storage devices and program instructions stored on the one or more computer readable storage devices, the stored program instructions comprising:
program instructions to generate, by a question and answer generator, questions and answers corresponding to a generated abstractive summary, wherein the generated abstractive summary is generated by a summary generator, wherein the summary generator comprises a transformer based sequence-to-sequence model(S) that is trained to receive a source document as an input and generate the abstractive summary token-by-token based on the input, and wherein an extractive questions and answer model is utilized to identify an answer to the generated questions and answers;

program instructions to evaluate received answers for the generated questions by analyzing received answers associated with the generated abstractive summary against answers received for an original summary;

program instructions to generate and output, through a user interface, responsive prompts that query a user to accept and rate the generated questions and answers associated with the generated abstractive summary;

program instructions to calculate a reward based on a similarity between answers associated with the generated abstractive summary and the original summary;

responsive to the calculated similarity being above a predetermined threshold, program instructions to generate and output a reward;

program instructions to utilize proximal policy optimization as an optimizer for policy training to prevent the summary generator from moving a predetermined distance from a pretrained language model; and program instructions to update the extractive questions and answer model by utilizing the policy training to apply the calculated reward to further train the summary generator.

16. The computer program product of claim 15, further comprising:
program instructions to train the generation model to receive a document as input, wherein the model is trained to optimize cross entropy loss; and
program instructions to receive, by an interface, the document to parse for textual information.

17. The computer program product of claim 15, further comprising:
program instructions to generate, by a summary generator, the generated abstractive summary based on a received document, wherein the generated abstractive summary is a summary encompassing text of the received document, and wherein the generated abstractive summary is considered relevant when the questions posed by the generated summary are answered correctly.

18. The computer program product of claim 15, further comprising:
program instructions to display, by an interface, a responsive prompt to a user, wherein the responsive prompt comprises the generated questions and answers that enable the user to input a response;
responsive to receiving one or more responses to the generated questions and answers, program instructions to evaluate, by a reward model, the received one or more responses to the generated questions.

19. The computer program product of claim 15, further comprising:
program instructions to implement the calculated rewards in a Reinforcement Learning (RL) based framework to train the summary generation model, wherein the textual similarity between the answers are taken as the reward.

20. The computer program product of claim 15, further comprising:
program instructions to evaluate the generated summary through multiple automatic measures, wherein the automatic measures are predetermined, and wherein the automatic measures are performed using ROUGE scores as well as question answering based evaluation framework.

* * * * *